Patented May 19, 1942

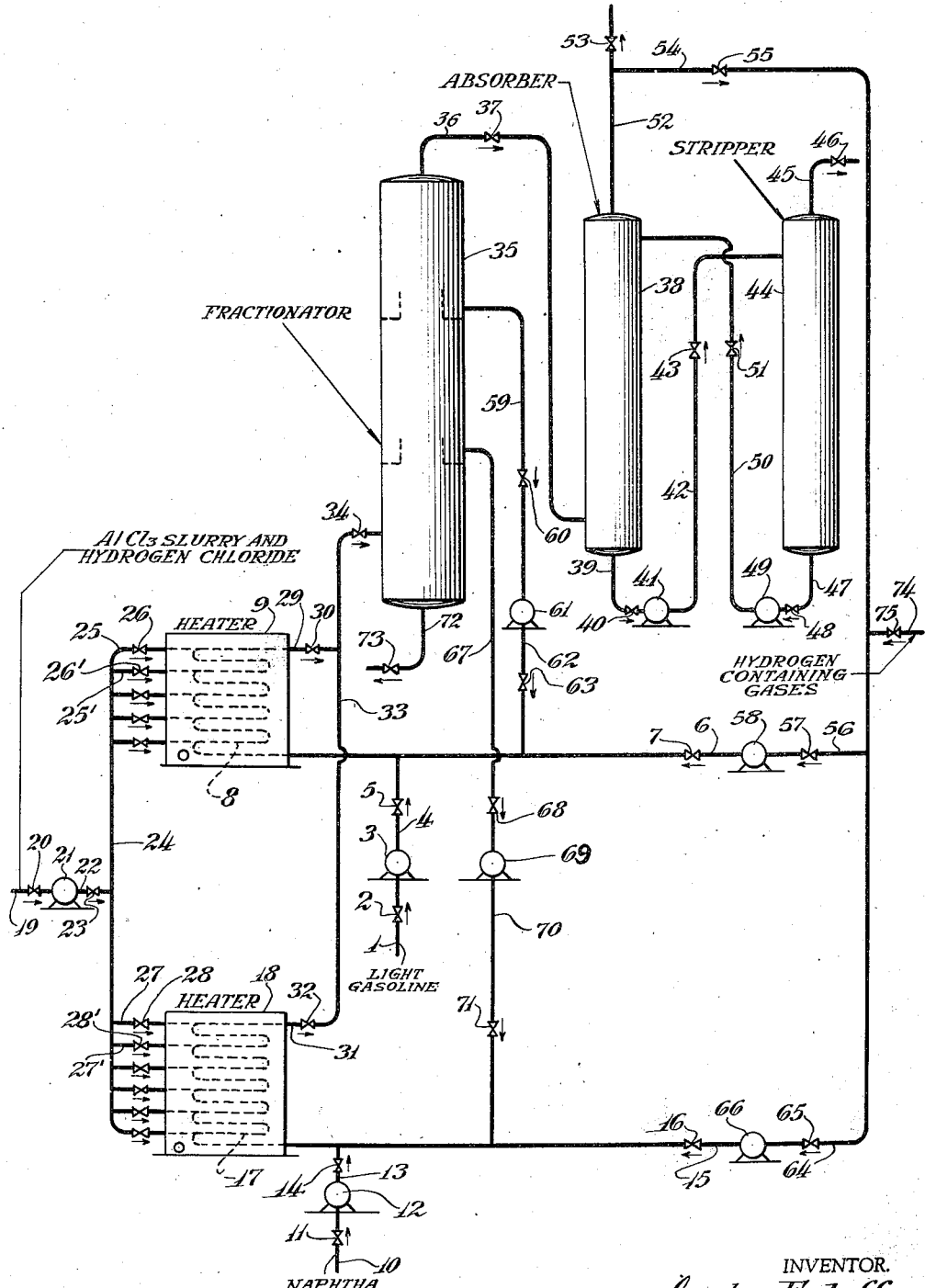

2,283,852

UNITED STATES PATENT OFFICE 2,283,852

PRODUCTION OF ISOPARAFFINS

Gustav Egloff, Chicago, Ill., assignor to Universal Oil Products Company, Chicago, Ill., a corporation of Delaware Application July 5, 1940, Serial No. 344,109

4 Claims. (Cl. 260—676)

This invention relates to the aluminum chloride treatment of low boiling gasolines and naphthas to produce therefrom substantial yields of isobutane and isopentane. More particularly, this process is concerned with a continuous method for the catalytic conversion of low boiling petroleum fractions with aluminum chloride in the presence of a minor quantity of hydrogen chloride and in the presence of hydrogen-containing gases to form high yields of isobutane and isopentane.

Isobutane and isopentane are materials of great importance to the oil industry as a result of processes of comparatively recent development which are effective in converting them to higher boiling isoparaffins suitable for direct use as aviation fuels. The isobutane may be catalytically or thermally dehydrogenated to form iso-butene which may then be polymerized to form branch chain octenes which readily hydrogenate to the corresponding iso-octanes. The isobutane may be alkylated with olefins using either thermal or catalytic processes to form isoparaffins boiling within the range of aviation gasoline. Isopentane may be processed in a manner similar to that used for isobutane. Owing to the fact that isopentane has a somewhat higher boiling point it may be directly used as a constituent of an aviation fuel.

The process of my invention is characterized by a number of advantageous features. As is well known, aluminum chloride reacts with hydrocarbons to form a viscous product which is difficult to force through a heating coil and which makes difficult the operation of continuous processes. In my invention gases containing hydrogen and paraffins are introduced in the coil in admixture with catalyst and charge. The function of the hydrogen and these low boiling paraffins is to decompose or to prevent the formation of the sludge-like material which normally causes coking in the coil. Another function of returning light process gases is to saturate the olefins that are formed in the aluminum chloride cracking process and thus to increase the yield of the final product. Another feature of my invention is the introduction of the catalyst at a plurality of points in the heating coil. This method of introduction of the catalyst increases its efficiency and results in a decrease in the amount used and the cost of the process.

In one specific embodiment the present invention comprises a process for the production of substantial yields of isobutane and isopentane which comprises subjecting a primary combined feed formed in a manner hereinafter described to the action of anhydrous aluminum chloride, a minor amount of hydrogen chloride, and hydrogen-containing gases in a heating coil, said aluminum chloride being injected into the charge at a plurality of points in the heating coil, simultaneously subjecting a secondary combined feed formed in a manner hereinafter described to the action of anhydrous aluminum chloride, a minor amount of hydrogen chloride and hydrogen-containing gases in a second heating coil, said aluminum chloride being injected into said second heating coil at a plurality of points, commingling the products from the two heating coils, and subjecting the mixture to a separation step to separate a gaseous fraction containing the isobutane and isopentane, a low boiling gasoline, a naphtha, and a non-vaporous liquid fraction containing the used catalyst in suspension, commingling the aforesaid low boiling gasoline with a low boiling gasoline charging stock to form said primary combined feed hereinbefore described, and commingling the naphtha fraction with a naphtha charging stock to form said secondary combined feed hereinbefore described.

The accompanying drawing diagrammatically illustrates in conventional manner means for carrying out and the process flow of my invention, and other features which will be subsequently described.

Referring now to the drawing, a light gasoline, for example, one boiling within the approximate range of 100–250° F. is supplied to the system through line 1, valve 2 and enters pump 3 which discharges into line 4 controlled by valve 5. This light gasoline is discharged from line 4 into line 6 wherein it is commingled with a recycle fraction of approximately the same boiling range and with a gaseous fraction, the origin of both streams to be hereinafter described. The mixture of low boiling gasolines and lean gases is discharged from line 6 into heating coil 8 so disposed as to receive heat from furnace 9.

A naphtha charging stock, for example, one having a boiling point of the approximate range of 250–450° F. is supplied to the system through line 10 and after passing through valve 11 enters pump 12 which discharges into line 13 controlled by valve 14. After passing through valve 14, the naphtha charging stock is commingled with the recycle fraction of the same general boiling range and with lean gases formed in the process. This mixture of liquids and lean gases is directed from line 15 to heating coil 17 so disposed as to receive heat from furnace 18. Anhydrous aluminum chloride in slurry form, together with a minor quantity of hydrogen chloride, is supplied to the system through line 19 controlled by valve 20 from which it enters pump 21 discharging into line 22 controlled by valve 23. After passing through valve 23, the slurried catalyst and hydrogen chloride enters line 24 which supplies heating coils 8 and 17 at a plurality of points. As indicated in the drawing, line 24 is connected to these two coils by a plurality of lines which for heating coil 8 are represented by lines 25, controlled by valve 26, 25' controlled by valve 26', etc., and for heating coil 17 by line 27 controlled by valve 28, line 27' controlled by valve 28', etc. The amount of anhydrous aluminum chloride used may vary within the range of approximately 1–5 weight per cent of the charge, the quantity of hydrogen chloride being of the order of ½ mole per cent of the liquid combined feed. The average temperature of the reactants in heating coil 8 will lie within the approximate range of 200–450° F. while that in heating coil 17 will lie between 250–550° F. The pressures used at the exit of these heating coils will lie within the range of atmospheric to several hundred pounds per square inch. The conversion products from heating coil 8 enter line 29 controlled by valve 30 from which they are discharged into line 33 wherein they are commingled with the conversion products of coil 17 which in turn discharge into line 33 by way of line 31 controlled by valve 32. The commingled products from the two heating coils pass through valve 34 and enter fractionating column 35. Fractionating column 35 operates to remove an overhead product containing the isobutane and isopentane formed in the process, together with the low boiling gaseous products. This low boiling overhead product is removed from column 35 through line 36 controlled by valve 37 and enters absorber 38. Fractionating column 35 operates in the conventional manner, although for the sake of simplicity, means for returning reflux to the column and for reboiling the higher boiling portions are not shown in the drawing.

Absorbing column 38 operates to remove substantially all the isobutane and isopentane from the entering gases. A naphtha fraction may be used as an absorbing medium and this scrubbing oil after enrichment is removed from column 38 by way of line 39 and after passing through valve 40 enters pump 41 which discharges into line 42 controlled by valve 43. After passing through valve 43 this rich oil enters stripper 44 wherein the dissolved isobutane-isopentane with smaller quantities of normal paraffins of the same order of boiling point are removed as an overhead product through line 45 controlled by valve 46. This hydrocarbon fraction contains isobutane and isopentane, the principal product of the process. The stripped naphtha is removed from column 44 by way of line 47 and after passing through valve 48 enters pump 49 which discharges into line 50 controlled by valve 51. After passing through valve 51 this stripped oil enters absorbing column 38 for re-use. The lean gases obtained from absorption column 38 are removed by way of line 52 and a portion of them may be removed from the system by passing through valve 53. A portion of these lean gases are recycled to the process by being directed through line 54 controlled by valve 55. The recycled lean gases are in part returned to heating coil 8 and in part to heating coil 17.

The lean gases being returned to heating coil 8 are removed from line 54 by way of line 56 and after passing through valve 57 enter compressor 58 which discharges into line 6 controlled by valve 7. The low boiling gasoline fractionated from the conversion products and which may be removed as a side cut from the fractionating column as indicated in the drawing enters line 59 controlled by valve 60 and then enters pump 61 which discharges into line 62 controlled by valve 63. After passing through valve 63 this low boiling gasoline recycle fraction is commingled with the light gasoline charging stock and with lean gases obtained from line 56. This mixture of liquid and gases is directed to heating coil 8 as hereinbefore set forth.

The remaining portion of the lean gases being recycled to the process is removed from line 54 by way of line 64 and after passing through valve 65 enters compressor 66 which discharges into line 15 controlled by valve 16. A naphtha recycle fraction fractionated from the conversion products, and which may be removed as a side cut from the fractionator as shown in the figure enters line 67 controlled by valve 68 and enters pump 69 which discharges into line 70 controlled by valve 71. This naphtha recycle fraction is commingled in line 15 with the naphtha charging stock for the process and with lean gases obtained from line 64. This mixture of naphtha and lean gases is discharged from line 15 into heating coil 17 for catalytic treatment as hereinbefore set forth.

The non-vaporous liquid residue removed from column 35 contains a used catalyst in suspension and is discharged from the system through line 72 controlled by valve 73.

The following example is introduced to illustrate the results obtainable by the use of the present invention but should not be construed as limiting it in exact correspondence with the data submitted. In operating my process, a straight run gasoline of boiling range of 100–250° F. and naphtha of 250–450° F. both obtained from Michigan crude oil of the Mount Pleasant type may be charged to the two heating coils after being commingled with recycle stocks of their respective boiling point ranges. The amount of aluminum chloride used to obtain the indicated results will be about 5% by weight of the charging stock while the amount of anhydrous hydrogen chloride will be about ½ mole per cent and the recycled hydrogen-containing gases will be about 2 moles of light gas per mole of combined feed. Operating with the light gasoline coil at an exit temperature of 375° F. and the naphtha coil at an exit temperature of 425° F., the total yield of isobutane on the basis of the charging stock may be 35% by volume and the iso-pentane 10% by volume.

I claim as my invention:

1. A process for the production of low boiling isoparaffins comprising subjecting a combined feed formed in a manner hereinafter described to the action of anhydrous aluminum chloride, a minor amount of hydrogen chloride, and hydrogen-containing gases in a primary reaction zone, simultaneously subjecting a second combined feed formed in a manner hereinafter described to the action of anhydrous aluminum chloride, a minor amount of hydrogen chloride, and hydrogen-containing gases in a second reaction zone, commingling the conversion products from the two reaction zones, and subjecting the mixture to a separation step to separate a fraction containing isobutane and isopentane, a low boiling gasoline, and a higher boiling naphtha, commingling the aforesaid low boiling gasoline with a low boiling gasoline charging stock to form the primary combined feed hereinbefore set forth and commingling the naphtha with a naphtha charging stock to form the second combined feed hereinbefore set forth.

2. A process for the production of low boiling isoparaffins comprising subjecting a primary combined feed formed in a manner hereinafter described to the action of anhydrous aluminum chloride, a minor amount of hydrogen chloride, and hydrogen-containing gases in a heating coil, said aluminum chloride being injected into the charge at a plurality of points in the heating coil, simultaneously subjecting a second combined feed formed in a manner hereinafter described to the action of anhydrous aluminum chloride, a minor amount of hydrogen chloride and hydrogen-containing gases in a secondary heating coil, said aluminum chloride being injected into said secondary heating coil at a plurality of points, commingling the products from the two heating coils, subjecting the mixture to a separation step to produce a gaseous fraction containing isobutane and isopentane, a low boiling gasoline, a naphtha, and a non-vaporous liquid fraction containing the used catalyst in suspension, commingling the aforesaid low boiling gasoline with a low boiling gasoline charging stock to form the said primary combined feed, and commingling the naphtha fraction with a naphtha charging stock to form said secondary combined feed.

3. A process for the production of low boiling isoparaffins comprising subjecting a primary combined feed formed in a manner hereinafter described to the action of anhydrous aluminum chloride, a minor amount of hydrogen chloride, and hydrogen-containing gases formed in a manner hereinafter described in a heating coil, said aluminum chloride being conducted into the heating coil at a plurality of points, simultaneously subjecting a secondary combined feed formed in a manner hereinafter described to the action of anhydrous aluminum chloride, a minor amount of hydrogen chloride and said hydrogen-containing gases in a second heating coil, said aluminum chloride being injected in a plurality of points in the heating coil, commingling the conversion products from the two heating coils, and fractionating them to separate a fraction containing isopentane, isobutane, and low boiling products, a low boiling gasoline, a naphtha, a non-vaporous liquid residue containing the used catalyst in suspension, subjecting the aforesaid fraction containing the isobutane and isopentane to contact with an absorption oil to separate substantially all the isopentane and isobutane from the remaining lean gases, commingling the aforesaid low boiling gasoline with the low boiling gasoline charging stock to form said primary combined feed, subjecting this primary combined feed to the catalytic action of anhydrous aluminum chloride and hydrogen chloride in the presence of the aforesaid lean gases in said primary heating coil and commingling the aforesaid naphtha with the naphtha charging stock to form said secondary combined feed and subjecting this secondary combined feed to the catalytic action of aluminum chloride and hydrogen chloride in the presence of the aforesaid lean gases in a secondary heating coil.

4. A process for the production of low boiling isoparaffins which comprises cracking a light gasoline fraction in the presence of aluminum chloride to form low boiling isoparaffins, simultaneously and concurrently cracking a naphtha fraction under separately controlled cracking conditions and in the presence of aluminum chloride to form low boiling isoparaffins, combining conversion products from both cracking steps and separating cracked vapors from residue, fractionating said cracked vapors to separate reflux condensate from the fractionated vapors, recovering the low boiling isoparaffins comprising isobutane and isopentane from the fractionated vapors, separating said reflux condensate into at least two fractions, a light reflux condensate having a boiling range approximating that of said light gasoline fraction and a heavy reflux condensate having a boiling range approximating that of said naphtha fraction, supplying said light reflux condensate to the first mentioned conversion step, and supplying said heavy reflux condensate to the second mentioned conversion step.

GUSTAV EGLOFF.